US012255869B2

(12) United States Patent
Nainar et al.

(10) Patent No.: US 12,255,869 B2
(45) Date of Patent: Mar. 18, 2025

(54) NAME RESOLUTION TRIGGERED MONITORING AGENT SELECTION

(71) Applicant: Cisco Technology, Inc., San Jose, CA (US)

(72) Inventors: Nagendra Kumar Nainar, Morrisville, NC (US); Carlos M. Pignataro, Cary, NC (US); David John Zacks, Vancouver (CA); Thomas Szigeti, Vancouver (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/897,745

(22) Filed: Aug. 29, 2022

(65) Prior Publication Data

US 2024/0073177 A1 Feb. 29, 2024

(51) Int. Cl.
*H04L 61/4511* (2022.01)
*H04L 61/2514* (2022.01)
*H04L 61/3015* (2022.01)
*H04L 67/1036* (2022.01)

(52) U.S. Cl.
CPC ...... *H04L 61/4511* (2022.05); *H04L 61/2514* (2013.01); *H04L 61/3015* (2013.01); *H04L 67/1036* (2013.01)

(58) Field of Classification Search
CPC ..... H04L 43/12; H04L 43/50; H04L 61/4511; H04L 61/2514; H04L 61/3015; H04L 67/1036; H04L 61/4541; H04L 63/0236
See application file for complete search history.

(56) References Cited

U.S. PATENT DOCUMENTS

| | | | | |
|---|---|---|---|---|
| 8,326,980 | B2 * | 12/2012 | Huang | H04L 43/0864 709/239 |
| 8,789,071 | B2 * | 7/2014 | Chang | H04L 41/5058 719/328 |
| 9,729,414 | B1 | 8/2017 | Oliveira et al. | |
| 10,397,071 | B2 * | 8/2019 | Hanson | H04L 41/5054 |
| 10,728,135 | B2 * | 7/2020 | Raney | H04L 67/34 |

(Continued)

OTHER PUBLICATIONS

"Endpoint Agents," retrieved from the Internet Jun. 7, 2022, 9 pages.

*Primary Examiner* — Alex H. Tran
(74) *Attorney, Agent, or Firm* — Edell, Shapiro & Finnan, LLC (57) ABSTRACT

Methods are provided to perform a name resolution triggered monitoring agent selection for full stack observability. The methods involve obtaining a name resolution request for an enterprise service to be accessed by an endpoint device. A plurality of service instances are configured to provide the enterprise service. The methods further involve determining, based on the name resolution request, a monitoring agent from a plurality of monitoring agents of a monitoring service that monitors performance of the enterprise service and selecting a service instance, from the plurality of service instances, that is associated with the monitoring agent in a name resolution record. The methods further involve providing, to the endpoint device, location information for accessing the service instance and provisioning the monitoring agent to monitor the performance of the enterprise service executed by the service instance for the endpoint device.

20 Claims, 6 Drawing Sheets

(56) References Cited

U.S. PATENT DOCUMENTS

| | | |
|---|---|---|
| 11,522,913 B1 * | 12/2022 | Yang .................... H04L 63/166 |
| 11,611,612 B2 * | 3/2023 | Azizullah ............... H04L 43/50 |
| 2013/0297596 A1 * | 11/2013 | Mouline ............ G06F 16/9537 |
| | | 707/723 |
| 2017/0195192 A1 | 7/2017 | Hanson et al. |
| 2018/0359311 A1 | 12/2018 | Paramasivam |
| 2020/0267061 A1 * | 8/2020 | Agarwal ............ H04L 41/5058 |
| 2021/0314238 A1 | 10/2021 | Cioffi et al. |
| 2021/0390039 A1 * | 12/2021 | Rodrigues ............... H04L 43/08 |
| 2022/0141107 A1 * | 5/2022 | Laxman Karibhimanvar ............ |
| | | H04L 43/0852 |
| | | 709/224 |
| 2022/0141195 A1 * | 5/2022 | Flavel .................... H04L 63/04 |
| | | 726/4 |
| 2022/0400098 A1 * | 12/2022 | Rao .................... H04L 67/1023 |

* cited by examiner

NAME RESOLUTION TRIGGERED MONITORING AGENT SELECTION

TECHNICAL FIELD

The present disclosure generally relates to data and communication networks.

BACKGROUND

As enterprises are moving towards a hybrid work environment, the percentage of the workforce connecting remotely increases resulting in new types of Information Technology (IT) related challenges. For example, there are challenges and limitations in obtaining IT support while an employee is working from the office versus working remotely. In the former case, the end-to-end infrastructure is owned and managed by the IT enterprise while in the latter case, part of the infrastructure is outside the scope of the IT enterprise. A remote working employee, while facing with an application not working type of error, may need to triage and determine that the local wireless connectivity, access-point (AP), Internet Service Provider (ISP), etc. are not the cause of the problem before reaching out to the enterprise IT support.

DETAILED DESCRIPTION

Overview

A mechanism is presented herein to determine a monitoring agent triggered by a name resolution request for an enterprise service. The monitoring agent provides full stack observability and is associated with one or more enterprise service instances.

In one form, a method is provided in which a name resolution request for an enterprise service to be accessed by an endpoint device is obtained. A plurality of service instances are configured to provide the enterprise service. The method further involves determining, based on the name resolution request, a monitoring agent from a plurality of monitoring agents of a monitoring service that monitors performance of the enterprise service and selecting a service instance, from the plurality of service instances, that is associated with the monitoring agent in a name resolution record. The method further involves providing, to the endpoint device, location information for accessing the service instance and provisioning the monitoring agent to monitor the performance of the enterprise service executed by the service instance for the endpoint device.

Example Embodiments

As explained above, hybrid work environment is challenging to troubleshoot and to diagnose connectivity issues. Tracking performance and troubleshooting often involves tracing performance along a path in one or more networks. That is, full stack observability is required.

Various network monitoring services are gaining momentum in the industry because they allow network/transport-level visibility across various networks such as the Internet. To gain this end-to-end visibility, these network monitoring services deploy different types of monitoring agents such as but not limited to a cloud monitoring agent, an enterprise monitoring agent, end-user/end point monitoring agent, a mobile monitoring agent, etc. Each monitoring agent has its own features and functionalities. Additionally, IT support enables different types of testcases (such as but not limited to a packet loss testcase, a latency testcase, a liveliness testcase, etc.) between these different monitoring agents to obtain a holistic view of the performance.

In a static environment such as branch to branch or branch to headquarters in an enterprise, it is easy to initiate the relevant monitoring agents and execute the testcases. In a dynamic environment such as remote workers or teleworkers, it is challenging. For example, the teleworkers may connect from a coffee shop for a couple of hours and then may connect from home or shared/coworking spaces for another couple of hours, the selection of monitoring agents that depend on the location from where the teleworker is connected becomes difficult. An enterprise service (e.g., Corp1.service1.example.com) may select an enterprise service instance running on East region web services when the teleworker is in Virginia and then resolve the same enterprise name (e.g., Corp1.service1.example.com) to another enterprise service instance running on West region web services when the teleworker is in California. Also, depending on the nature of access connectivity, it is not practically possible to have a static set of testcases being executed from the teleworker to monitoring agents in the cloud or in the enterprise network. Without context awareness, teleworker's endpoint device may become busy with performance monitoring instead of performing the actual task at hand, i.e., executing productive functionality.

Typically, monitoring agent details for monitoring an enterprise service are manually retrieved and are then leveraged, by a network or enterprise controller, to provision the endpoint device of the user with relevant testcases. In a static environment, this is possible but in a dynamic environment such as teleworking, it is very difficult.

The techniques presented herein leverage a name resolution service to dynamically provision monitoring agents and/or testcases. The techniques utilize a name resolution-based service to identify potential traffic profile and relevant monitoring agent(s) associated with the enterprise service instance. For example, a first monitoring agent is selected when the enterprise service instance is running on East region web services and a second monitoring agent is selected when another enterprise service instance is running on West region web services.

The techniques presented herein allow a user (e.g., a teleworker) to monitor performance of an enterprise service using relevant monitoring agents that are determined based on context awareness such as traffic profile and/or location of the enterprise service instance that changes overtime and is varied based on the location of the endpoint device. The techniques presented herein provide full stack observability is a hybrid environment i.e., an environment in which different networks are involved.

In these techniques, a name resolution service includes a plurality of name resolution records that are populated and/or augmented with monitoring agent details associated with enterprise service instances. In one example embodiment, when a user sends a name resolution request, the request may include additional details such as a location of the endpoint device and an indicator that the name resolution service is to reply with monitoring agent(s) associated with the enterprise service instance. The details associated with enterprise service and the monitoring service are then provided in the response. In another example embodiment, the name resolution service is leveraged to select the relevant monitoring agent(s) based on an enterprise service instance and a locally stored user profile. Additionally, based on a type of traffic the user's endpoint device is handling, relevant testcases are identified, thereby avoiding overloading the endpoint device with monitoring tasks.

Figure 1:
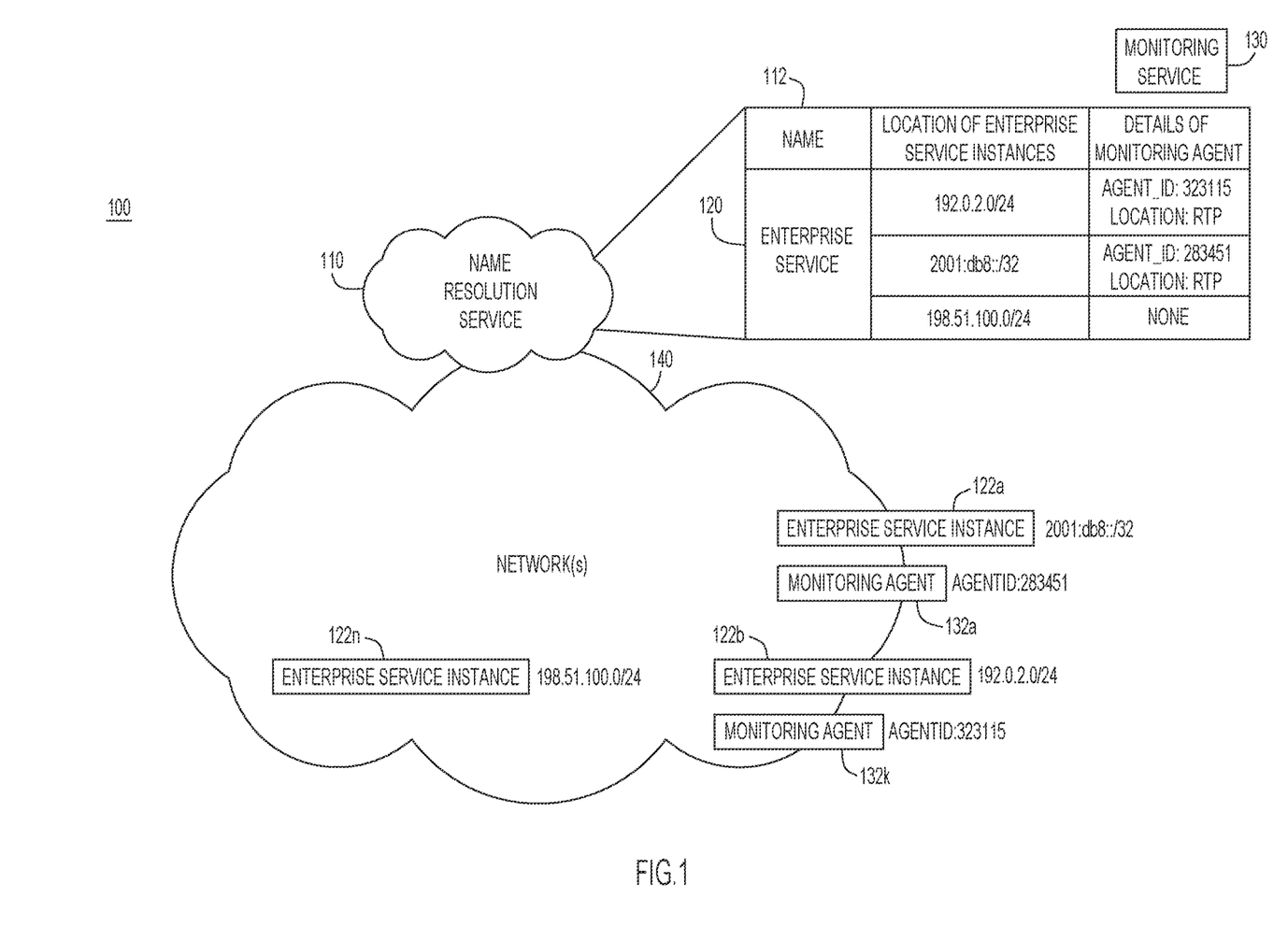
FIG. 1 is a block diagram illustrating a system in which a name resolution triggered monitoring agent selection is performed to monitor an enterprise service, according to an example embodiment.

FIG. 1 is a block diagram illustrating a system 100 in which a name resolution triggered monitoring agent selection is performed to monitor an enterprise service, according to an example embodiment.

The system 100 includes a name resolution service 110, an enterprise service 120 being provided by a plurality of enterprise service instances 122a-n, a monitoring service 130 being provided by a plurality of monitoring agents 132a-k. The plurality of enterprise service instances 122a-n and the plurality of monitoring agents 132a-k are provided at various locations across one or more network(s) 140. This is only an example of the system 100, and the number and types of entities may vary based on a particular deployment and use case scenario, such as the type of enterprise services and monitoring services being provided and network structures of various network(s) 140.

The notation "a-n", "a-m", "a-k", "a-j", "a-h", "a-g", "a-p", and "a-q", and the like denote that a number is not limited, can vary widely, and depend on a particular use case scenario.

A name resolution service 110 is configured to resolve a name of an enterprise service 120 to a particular location. In one example embodiment, the name resolution service 110 is an open domain name system (open DNS) that maps a name of the enterprise service 120 (e.g., Corp1.service1.example.com) to one or more locations (e.g., internet protocol (IP) addresses). In another example embodiment, the name resolution service 110 is a private DNS such as an enterprise monitoring agent DNS service that maps the name of the enterprise service 120 to private IP addresses (internal addresses in private network(s)).

The name resolution service 110 is configured to resolve the name by performing a DNS lookup operation. Specifically, the name resolution service searches a name resolution storage 112 for the name of an enterprise service 120 received in a name resolution request. The name resolution storage may be a name resolution database that includes a name of the enterprise service 120 and one or more location (s) for accessing the enterprise service 120. A location of the enterprise service 120 may be an IP address.

The enterprise service 120 is an application or service provided by an enterprise. Some examples of the enterprise service include but not limited to a personal cloud storage service, an online backup service, a gaming application, a streaming application, a document management application, or some other web-based application. The enterprise service 120 is executed by a plurality of enterprise service instances 122a-n.

Each enterprise service instance is configured to provide the enterprise service 120. The plurality of enterprise service instances 122a-n may execute load balancing such that a first enterprise service instance 122a handles a portion of service requests and a second enterprise service instance 122b handles another portion of service requests. The plurality of enterprise service instances 122a-n may provide services to different types of endpoint devices or client devices. For example, a third enterprise service instance 122n may service requests originating from mobile endpoint devices while the second enterprise service instance 122b may service requests originating from on-premises enterprise endpoint devices. The plurality of enterprise service instances 122a-n may handle requests from different locations. For example, the first enterprise service instance 122a may be configured to handle requests from endpoint devices located on the East coast of the United States, whereas the third enterprise service instance 122n may be configured to handle requests from endpoint devices located on the West coast of the United States. These are just some non-limiting examples of deployments and configurations of the plurality of enterprise service instances 122a-n.

Since the enterprise service 120 is provided by the plurality of enterprise service instances 122a-n, the name resolution service 110 may resolve the name of the enterprise service 120 to a different IP address, which corresponds to one of the plurality of enterprise service instances 122a-n. For example, in the name resolution storage 112, the name of the enterprise service 120 (e.g., Corp1.service1.example.com) is mapped to the first enterprise service instance 122a that has an IP address of 2001: db8::/32, is also mapped to the second enterprise service instance 122b that has an IP address of 192.0.2.0/24, and is further mapped to the third enterprise service instance 122n has an IP address of 198.51.100.0/24.

The name resolution storage 112 is further augmented with additional monitoring agent details. The plurality of monitoring agents 132a-k execute a monitoring service 130 that monitors the performance of the enterprise service 120 and/or troubleshoots problems with the enterprise service 120. Some non-limiting examples of the monitoring service 130 include network monitoring tools, network device monitoring, cloud network monitoring, endpoint device monitoring, software performance monitoring, etc.

Each monitoring agent may be a container that sends a probe and received a response back. The plurality of monitoring agents 132a-k trace performance along a path in the network(s) 140. There are various types of monitoring agents such as but not limited to enterprise monitoring agents that monitor performance of the enterprise service 120 in an enterprise network (one of the network(s) 140). The enterprise monitoring agents are specific to the enterprise and its enterprise network. There are cloud monitoring agents that monitor performance of the enterprise service 120 in a cloud network or the Internet. There are mobile monitoring agents that monitor mobile endpoint devices, etc. The plurality of monitoring agents 132a-k execute various testcases depending on attributes or characteristics of the enterprise service 120, the endpoint device, and/or the network(s) 140.

Testcases define type of telemetry data or information to collect. Telemetry data may be collected at each hop (network device) the packet travels in the network(s) 140. Telemetry data, sometimes called "collection data" or "measurement data", are values obtained from monitoring i.e., monitoring by network devices performance of the network(s) 140, and the enterprise service 120. The telemetry data includes various information such as identifiers, timestamps, interfaces visited, queue depth, etc., for each network device the packet traverses along the path. A network controller (not shown) analyzes the telemetry data to determine performance related issues and/or to perform troubleshooting of the enterprise service 120. Based on analyzing the telemetry data, one or more devices and/or monitoring agents 130*a-k* may be configured or reconfigured e.g., to gather additional telemetry data, to change a network device setting, to reconfigure one of the plurality of enterprise service instances 122*a-n*, to reconfigure one of the monitoring agents 130*a-k* with different or additional testcases, etc.

In the system 100, the plurality of enterprise service instances 122*a-n* are hosted in different geographic locations. The first enterprise service instance 122*a* is associated with a first monitoring agent 132*a*. Specifically, the name resolution storage 112 includes an agent identifier (agent_ID), which may be in a form of alphanumeric characters such as 283451 and a location of the respective monitoring agent such as an IP address or a geographic name "Mumbai, India". The second enterprise service instance 122*b* is associated with the second monitoring agent 132*k*. The name resolution storage 112 includes the agent ID of 323115 and the location "Research Triangle Park (RTP), NC". The third enterprise service instance 122*n* does not have a monitoring agent associated therewith.

In the system 100, a monitoring agent is hosted as close as possible to the respective service instance such as a virtual machine (VM) hosted on the same server or a container injected as part of the POD, etc. These hosted monitoring agents 132*a-k* may share the same IP address (with different transport layer details) as their respective enterprise service instances and/or may have their own IP addresses. In either case, the name resolution storage 112 is populated and/or augmented with the relevant monitoring information sufficient to determine the monitoring agent. In one example embodiment, the monitoring information includes testcases that the determined monitoring agent is to execute. These are just some examples of the monitoring information that may be included in the name resolution storage 112.

In the system 100, for the sake of simplicity, only one enterprise service 120 and one monitoring service 130 are depicted. It is understood that there are multiple monitoring services and enterprise services depending on a particular use case scenario and service deployment.

The network(s) 140 includes one or more networks such as public networks (the internet) and private networks. The network(s) 140 includes a plurality of network devices or transport nodes (not shown) that transport data in a form of packets. The network devices may include, but are not limited to switches, virtual routers, leaf nodes, spine nodes, etc. The network devices include a central processing unit (CPU), a memory, a packet processing logic, an ingress interface, an egress interface, one or more buffers for storing various packets of various traffic flows, and one or more interface queues.

In various example embodiments, the entities of the system 100 (the name resolution service 110, the plurality of enterprise service instances 122*a-n*, the plurality of monitoring agent instances 132*a-k*) may each be executed by one or more computing devices such as servers that include a network interface, at least one processor, and a memory. Each computing device may be any programmable electronic device capable of executing computer readable program instructions. The network interface may include one or more network interface cards (having one or more ports) that enable components of the entity to send and receive data over the network(s) 140. Each computing device may include internal and external hardware components such as those depicted and described in further detail in FIG. 6. In one example, at least some of these entities may be embodied as virtual devices with functionality distributed over a number of hardware devices such as virtual switches, routers, etc.

Figure 2:
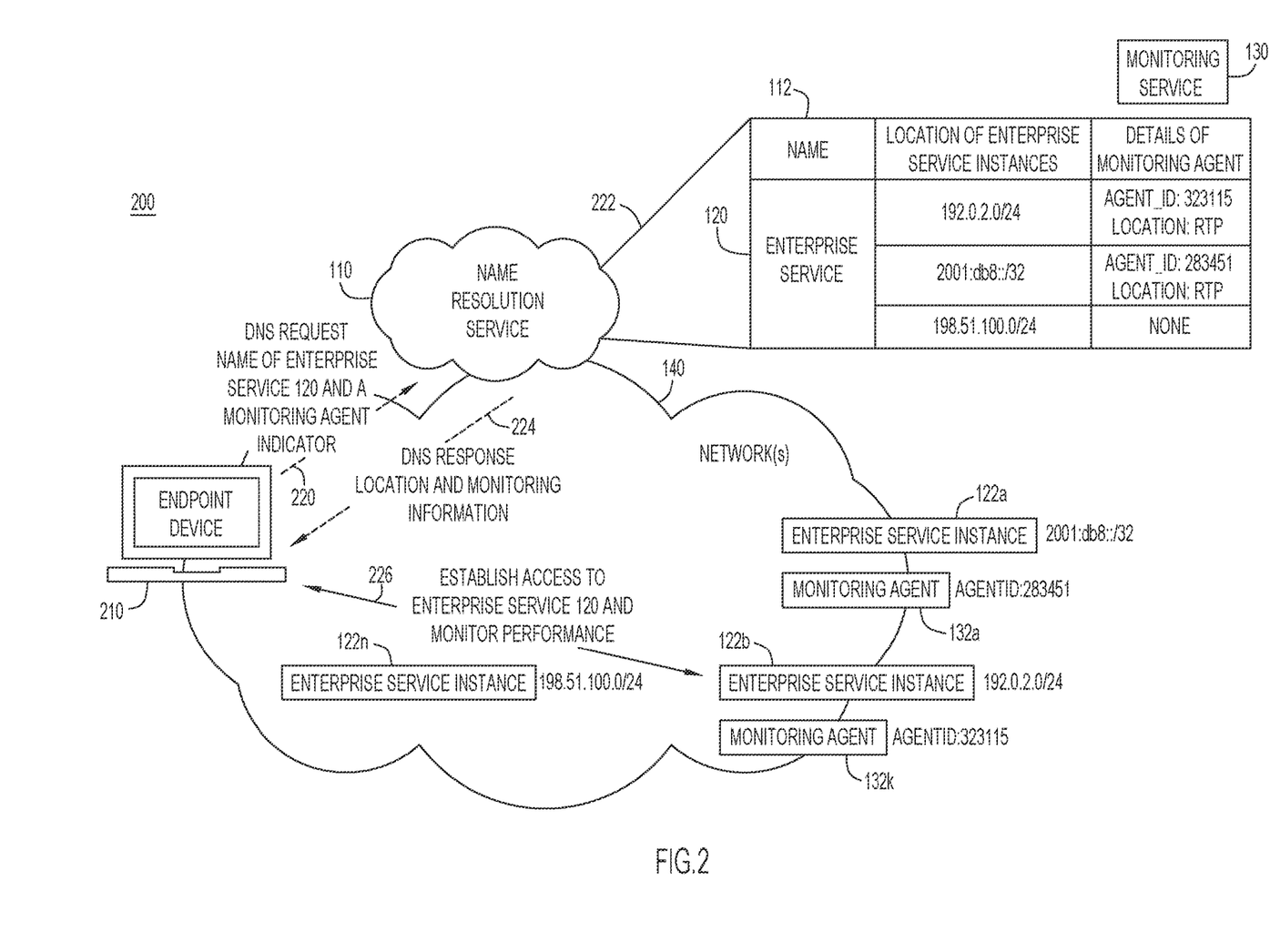
FIG. 2 is an operational diagram illustrating a client triggered selection method in which a monitoring agent is selected based on additional information included in a name resolution request, according to an example embodiment.

With continued reference to FIG. 1, FIG. 2 is an operational diagram illustrating a client triggered selection method 200 in which a monitoring agent is selected based on additional information included in a name resolution request, according to an example embodiment. The selection method 200 involves the entities of the system 100 of FIG. 1 and an endpoint device 210.

The endpoint device 210 is a data source device or a data sink device. The endpoint device 210 is a client device or a user device that generates data based on input from an operator, a user, a teleworker. For example, the endpoint device 210 maybe a mobile device or a smart phone that requests access to the enterprise service 120. In another example, the endpoint device 210 generates data based on input from a service running on a server that responds to requests or performs actions based on the requests.

The client triggered selection method 200 involves at 220, the endpoint device 210 initiating a name resolution request for the enterprise service 120. The name resolution request is a DNS request that includes a name of the enterprise service 120 ("Corp1.service1.example.com"). The name resolution request is augmented with additional information such as but not limited to an indicator. For example, the indicator is a new Opcode or a new flag in the existing OpCode. The indicator is for enabling the monitoring service 130 during execution of the enterprise service 120 for the endpoint device 210. The indicator represents that the endpoint device 210 supports monitoring agent selection feature. Specifically, while triggering the name resolution, the user includes additional details in a DNS packet requesting not just the IP address of the enterprise service 120 but also monitoring information about the monitoring agent associated with the enterprise service instance, testcases supported, etc.

At 222, the name resolution service 110, upon receiving the name resolution request, determines that the monitoring information also needs to be provided based on the indicator in the name resolution request. As such, the name resolution service 110 performs a lookup in the name resolution storage 112 to identify an IP address of an enterprise service instance such as Software as a Service (SaaS) and the associated monitoring agent.

In one example embodiment, the indicator included in the DNS request packet may also be associated with the semantic that the user is looking for an enterprise service instance that has an associated monitoring agent (and not the geo-close enterprise service instance). This allows the user to query the enterprise service instance that has an associated monitoring agent to monitor the performance the enterprise service 120 while the endpoint device 210 accesses the enterprise service 120. For example, while, geographically, the closest enterprise service instance to provide the enterprise service 120 for the endpoint device 210 may be the third enterprise service instance 122*n*, the name resolution service 110 selects the second enterprise service instance 122*b* that is associated with the second monitoring agent 132*k* in a name resolution record stored in the name resolution storage 112. The name resolution service 110 does not select the third enterprise service instance 122*n* because it does not have an associated monitoring agent.

At 224, the name resolution service 110 transmits a DNS response to the endpoint device 210. The DNS response includes an IP address "192.0.2.0/24" of the second enterprise service instance 122*b* and monitoring information about the second monitoring agent 132*k*. The monitoring information includes the agent ID "323115" and location "RTP" of the second monitoring agent 132*k*, determined to monitor the performance of the enterprise service 120 being accessed by the endpoint device 210. Additionally, the monitoring information may include one or more testcases to be executed by the second monitoring agent 132*k*.

At 226, the endpoint device 210 accesses the enterprise service 120 based on the information in the DNS response. Further, the second monitoring agent 132*k* is provisioned to monitor the performance of the enterprise service 120 being executed by the second enterprise service instance 122*b*. In other words, the second monitoring agent 132*k* monitors performance while the endpoint device 310 accesses the enterprise service 120 using the second enterprise service instance 122*b*.

In the client triggered selection method 200, the endpoint device 210 is a client aware monitoring agent selection technique. The endpoint device 210 is configured or updated to support monitoring agent selection feature. That is, the endpoint device 210 generates DNS requests that are modified to include additional information such as the location of the endpoint device 210 and the indicator.

Figure 3:
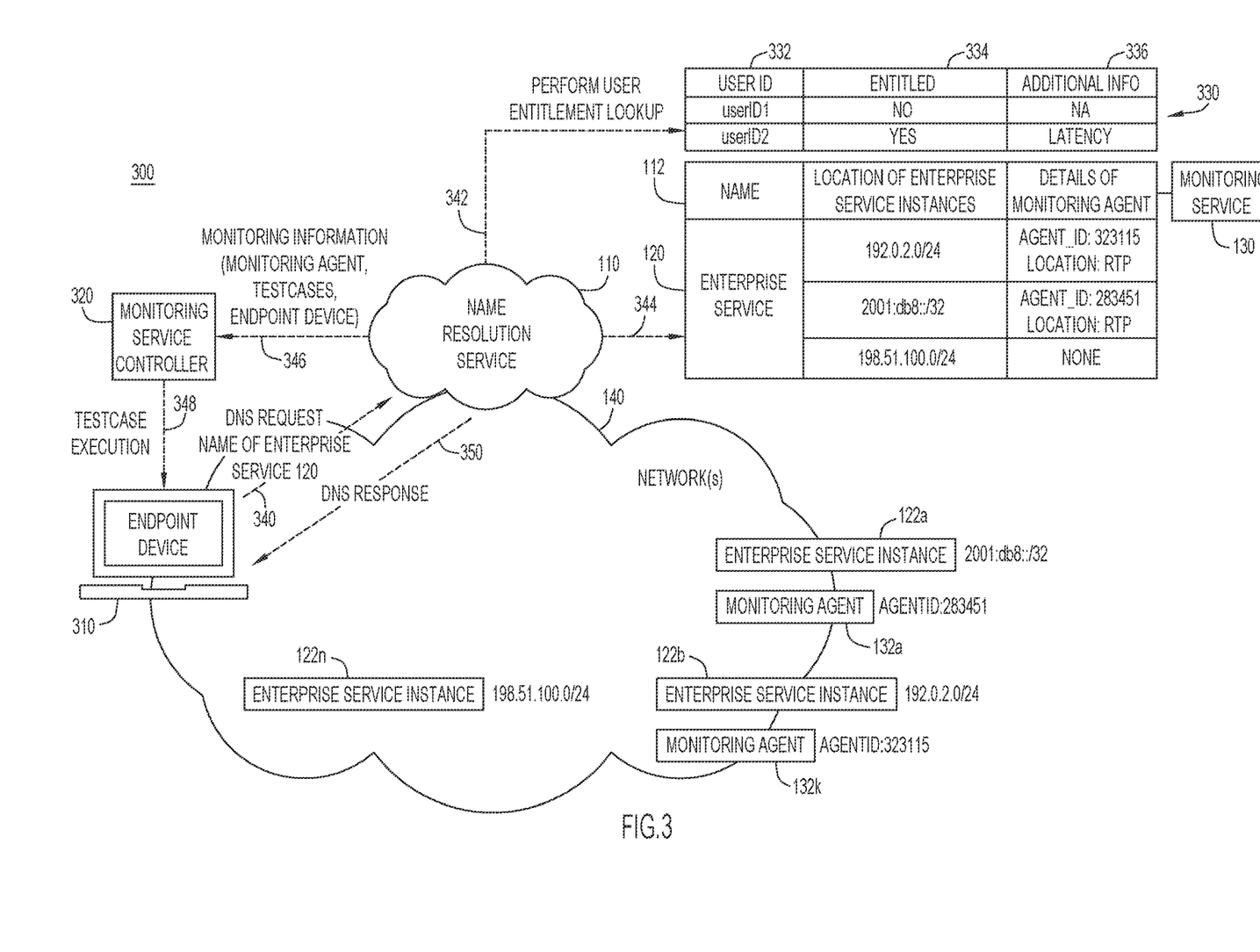
FIG. 3 is an operational diagram illustrating a service triggered selection method in which a monitoring agent is selected based on information in a locally stored user profile, according to another example embodiment.

With continued reference to FIG. 1, FIG. 3 is an operational diagram illustrating a service triggered selection method 300 in which a monitoring agent is selected based on information in a locally stored user profile, according to another example embodiment.

Unlike the client triggered selection method 200 of FIG. 2, the service triggered selection method 300 does not require any modifications of endpoint devices. That is, the service triggered selection method 300 is a client agnostic monitoring agent selection method in which endpoint devices are unaware that a monitoring agent is being determined for monitoring the performance of the enterprise service 120.

The service triggered selection method 300 involves the entities of the system 100 of FIG. 1, an endpoint device 310, a monitoring service controller 320, and a user profile storage 330.

The endpoint device 310 is similar to the endpoint device 210 of FIG. 2 but is not enabled with additional monitoring agent selection feature.

The monitoring service controller 320 controls the monitoring service 130 and provisions selected monitoring agent(s) to monitor performance of the enterprise service 120 being accessed by the endpoint device 310. The monitoring service controller 320 is an orchestrator (a network intelligence platform) that provisions selected monitoring agent(s) to run a variety of testcases to monitor the performance of the enterprise service 120 and/or the network(s) 140. The monitoring service controller 320 obtains full stack observability such as conditions and characteristics of the end-to-end paths from the endpoint device 310 across the network(s) 140 to the selected enterprise service instance. The monitoring service controller 320 may provision various testcase executions (such as latency, throughput, etc.). The monitoring service controller 320 further provisions time intervals, direction of telemetry data collection, and protocols, etc.

The name resolution service 110 accesses the name resolution storage 112 and an additional user profile storage 330. The user profile storage 330 is populated and/or augmented with user profile records that have a user identifier 332, entitlement information 334 indicating whether the monitoring agent selection service is enabled for a particular user, and additional monitoring information 336 such as testcases to be executed by the monitoring service 130. The user profile storage 330 is a teleworker entitlement database that may be a local database associated with the name resolution storage 112 or maybe a separate remote storage that is to be accessed by the name resolution service 110.

The service triggered selection method 300 involves at 340, the endpoint device 310 sending a name resolution request e.g., a DNS request. The DNS request includes the name of the enterprise service 120 e.g., a typical or standard DNS request. The DNS request does not include any additional monitoring related information such as the indicator. The endpoint device 310 is not enabled or configured with an enhanced monitoring agent selection feature. The endpoint device 310 is agnostic to a selection of the monitoring agent. The endpoint device 310 does not require any awareness of the monitoring agent selection process. The endpoint device 310 is not upgraded nor has it been configured to be aware of this feature.

At 342, the name resolution service 110 analyzes the DNS request to obtain user related information such as the user ID. The name resolution service 110 performs a lookup operation in the user profile storage 330 using the user ID. Specifically, the name resolution service 110 checks a local database (the user profile storage 330) to identify if the user is entitled to monitoring agent selection feature/service. The user ID is just one example of identifying the user, other information (e.g., IP address, etc.) to identify the user is within the scope of this disclosure and may vary depending on implementation details. In addition to determining whether the user is entitled to the monitoring agent selection service, the name resolution service 110 obtains additional monitoring information 336 such as testcases (latency).

If the user is entitled to additional monitoring agent selection service, e.g., the userID2, at 344, the name resolution service 110 searches the name resolution storage 112 to determine the relevant monitoring agent. The name resolution service 110 determines the second monitoring agent 132*k* based on context awareness such as the location of the endpoint device 310 (e.g., source IP address).

At 346, the user details and the monitoring agent details (monitoring information) are provided to the monitoring service controller 320. Specifically, the name resolution service 110 transmits information about the endpoint device 310 (e.g., source IP address), the selected second monitoring agent 132*k*, and the "latency" testcase to the monitoring service controller 320.

At 348, the monitoring service controller 320 instantiates the relevant testcases using the second monitoring agent 132*k* such as cloud/enterprise monitoring agent, end user monitoring agent, etc.) and executes the "latency" testcase that collects telemetry data related to delays in packet transmission.

At 350, the name resolution service 110 transmits a DNS response to the endpoint device 310. The DNS response includes a location (e.g., an IP address) of the selected second enterprise service instance 122b that is associated with the selected second monitoring agent 132k. The endpoint device 310 is not aware that a monitoring agent was selected for monitoring performance while the endpoint device 310 is accessing the enterprise service 120.

On the other hand, if the user is not entitled to the monitoring agent selection feature (e.g., UserID1), the name resolution service 110 performs a lookup operation in the name resolution storage 112 for an enterprise service instance closest to the endpoint device 310. The name resolution service 110 may then select the third enterprise service instance 122n. In this case, operations 346 and 348 are skipped. At 350, the name resolution service 110 transmits a DNS response that includes the location of the third enterprise service instance 122n.

In both cases, at 350, the DNS response does not include any monitoring information and the endpoint device 310 remains agnostic about the monitoring agent and testcases selections that were performed by the name resolution service 110 for the endpoint device 310.

Example embodiments of FIGS. 2 and 3 illustrate a process of selecting a monitoring agent associated with various enterprise service instances. However, this is provided for the sake of simplicity only and it is understood that various monitoring agents may be associated with a particular enterprise service instance depending on a particular deployment. For example, the selected monitoring agent may include a plurality of monitoring agents such as a cloud agent that provides an "outside-in" visibility of the network that services the network path between the selected enterprise service instance and the respective endpoint device and an endpoint agent that is installed on the respective endpoint device to monitor the performance of the enterprise service 120.

Example embodiments of FIGS. 2 and 3 leverage the name resolution service 110 as an OpenDNS service. In another example embodiment, the monitoring agent selection may be performed in a private name resolution service (a private DNS service).

Figure 4:
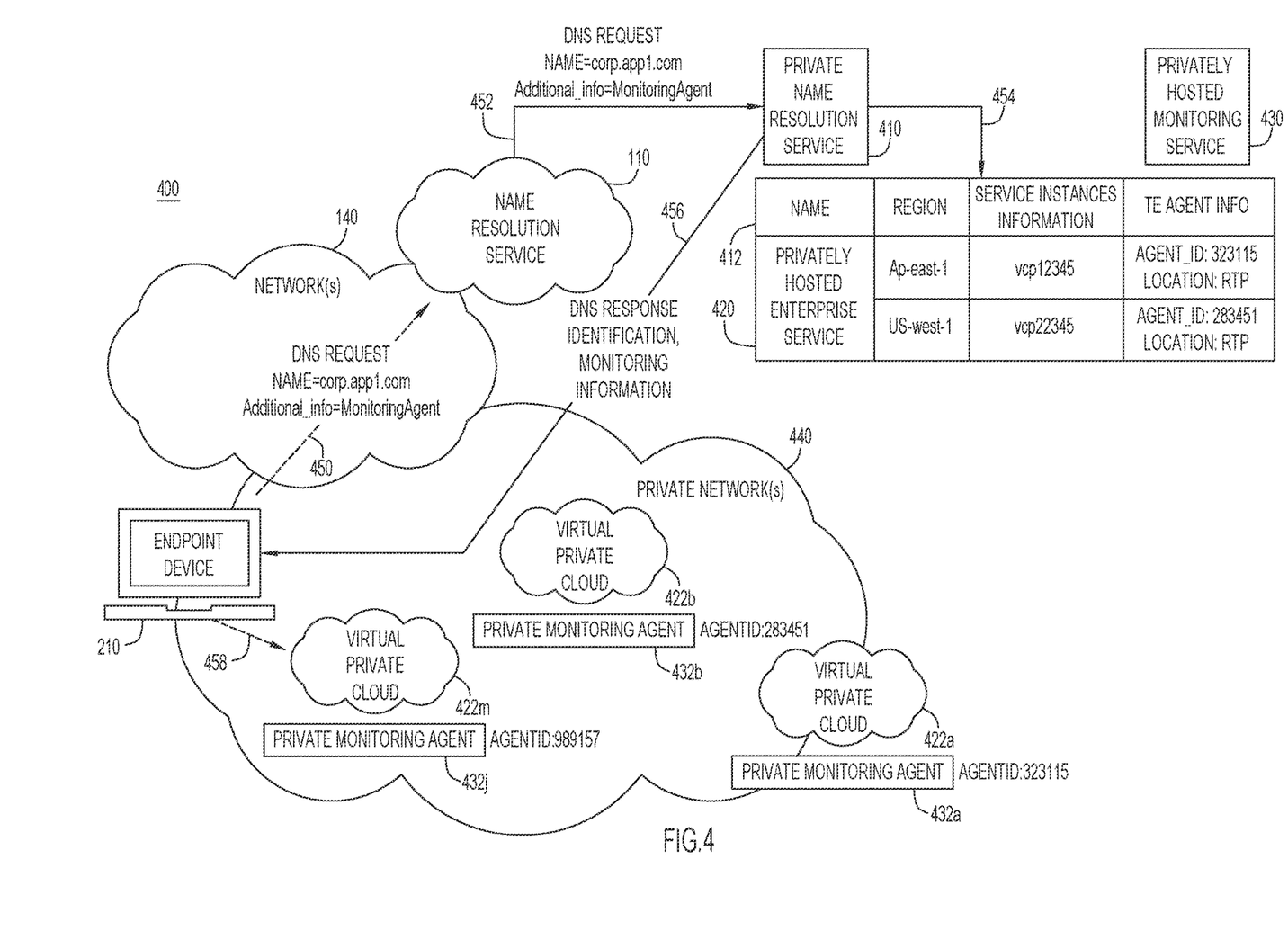
FIG. 4 is an operational diagram illustrating a monitoring agent selection method in which a monitoring agent is selected using a private name resolution service, according to yet another example embodiment.

FIG. 4 is an operational diagram illustrating a monitoring agent selection method 400 in which a monitoring agent is selected using a private name resolution service, according to another example embodiment.

The monitoring agent selection method 400 involves the endpoint device 210 of FIG. 2, the name resolution service 110 of FIGS. 1 and 2, a private name resolution service 410, a plurality of virtual private clouds (VPCs) 422a-m that execute a privately hosted enterprise service 420, a plurality of private monitoring agents 432a-j that execute a privately hosted monitoring service 430. The plurality of VPCs 422a-m and the plurality of private monitoring agents 432a-j are in privately hosted network zones i.e., private network(s) 440.

The private name resolution service 410 is a private DNS service or a scalable cloud DNS service such as Route 53. The private name resolution service 410 access an internal domain name resolution database 412 that include a name of the privately hosted enterprise service 420, identifiers of the plurality of VPCs 422a-m and region(s) serviced by each of the plurality of VPCs 422a-m or its respective location, and associated monitoring information. For example, the first VPC 422a has an identifier VPC12345 servicing AP-east 1 and is associated with a first private monitoring agent 432a that has an agent ID of 323115 and a location of RTP. The second VPC 422b has an identifier of VPC22345 and services US-west 1. The second VPC 422b is associated with a second private monitoring agent 432b with an identifier of 283451. The third VPC 422m may be a backup VPC (for load balancing) that is associated with a third private monitoring agent 432j that has an agent ID of 483321 (not shown) and location AP.

The monitoring agent selection method 400 includes at 450, the name resolution service 110 obtaining a DNS request from the endpoint device 210. The DNS request includes a name of the privately hosted enterprise service 420 and an indicator that enables selection of the monitoring agent to perform a privately hosted monitoring service 430 that monitors performance of the privately hosted enterprise service 420.

The name resolution service 110 determines that the DNS request is for a privately hosted enterprise service 420. For example, the DNS request may include a flag indicating that the request is to be offloaded to a private service. As another example, the redirection may be based on forwarding rules or policies at the name resolution service 110. At 452, the name resolution service 110 redirects or forwards the DNS request to the private name resolution service 410.

At 454, the private name resolution service 410 analyzes the DNS request and determines that a monitoring agent is needed based on the indicator in the request. The private name resolution service 410 further analyzes the location of the endpoint device 210 and selects a monitoring agent and an associated VPC. The orchestration of the testcases is performed either by a private zone controller of the selected VPC or by an OpenDNS to a traffic engineering (TE) controller.

At 456, a DNS response is provided to the endpoint device 210, the DNS response includes location and/or identification of a selected VPC from the plurality of VPCs 422a-m and location and/or identification of a selected associated monitoring agent from the plurality of private monitoring agents 432a-j.

At 458, the endpoint device 210 uses location or identifier of the selected VPC to access the privately hosted enterprise service 420. Additionally, the privately hosted monitoring service 430 is enabled to monitor the performance of the privately hosted enterprise service 420. An orchestration of testcases is performed either by a private zone controller (not shown) of the selected VPC or by the name resolution service 110 to a traffic engineering (TE) controller such as the monitoring service controller 320 of FIG. 3. The controller provisions the selected private monitoring agent to monitor the performance of the privately hosted enterprise service 420 using the monitoring testcases that indicate type of telemetry data to collect.

For example, the controller may provision several monitoring agents to monitor throughput in both directions at a predetermined time interval using a particular protocol such as transmission control protocol (TCP).

In the monitoring agent selection method 400, the internal domain name resolution database 412 is populated and/or augmented in a private zone with monitoring information for determining the target monitoring agent(s).

According to the techniques presented above, the relevant monitoring agents are selected and provisioned based on an associated service instance using a name resolution service. The monitoring agents monitor performance of an enterprise service that is executed by various service instances. The monitoring agents are determined based on context awareness such as location and traffic profile of the associated endpoint device. The techniques presented above, leverage name resolution service to identify traffic profile and relevant monitoring agents associated with a service instance in a hybrid environment (such as teleworking). The techniques presented above identify various monitoring agents and provision various testcases in a hybrid environment that may be changing frequently.

Figure 5:
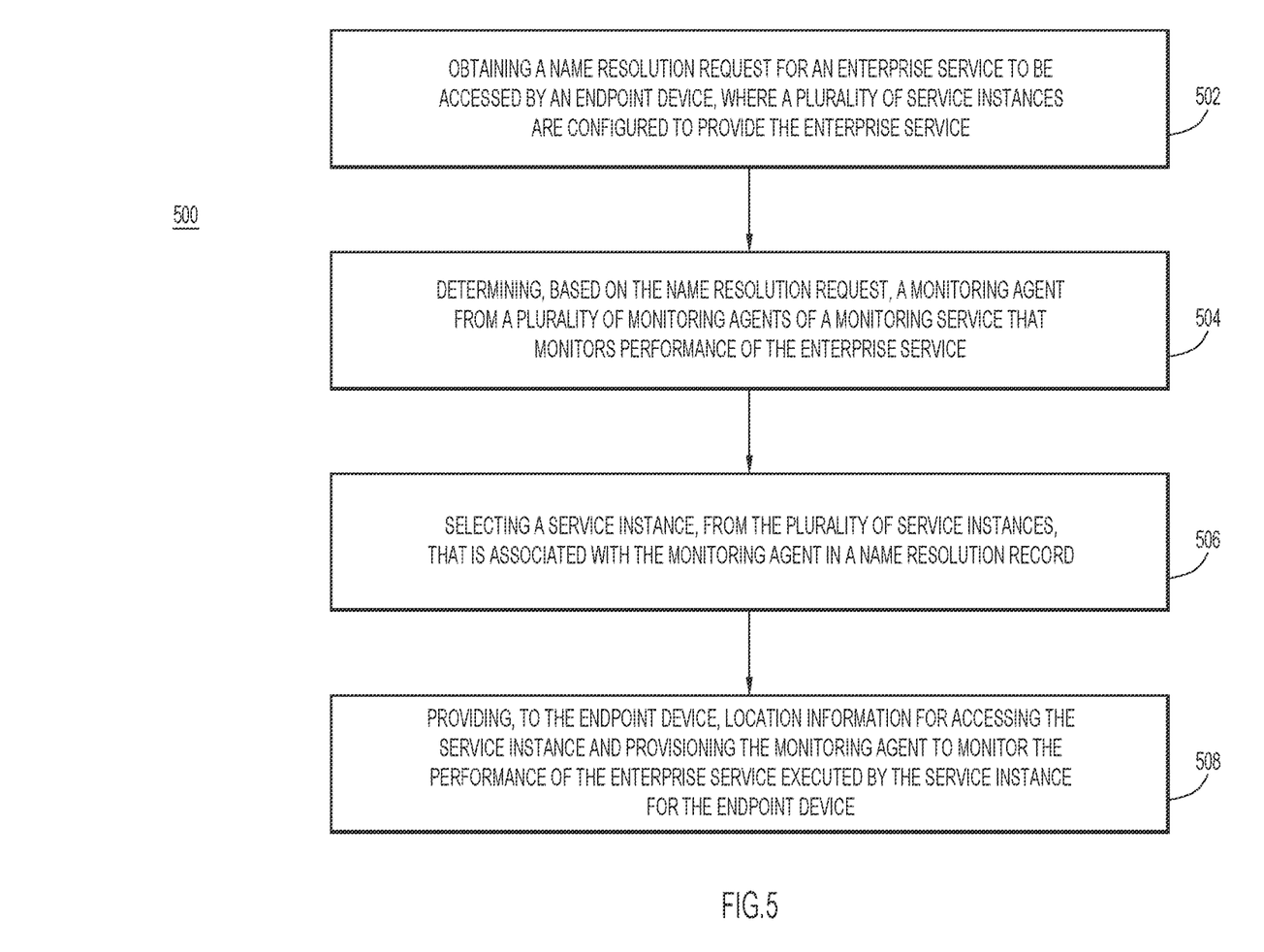
FIG. 5 is a flow diagram illustrating a method of determining a monitoring agent for monitoring performance of an enterprise service, according to an example embodiment.

FIG. 5 is a flowchart illustrating a method of 500 of determining a monitoring agent for monitoring performance of an enterprise service, according to an example embodiment. The method 500 may be performed by one or more computing devices such as the name resolution service 110 of FIGS. 1-3 or the private name resolution service 410 of FIG. 4.

The method 500 involves, at 502, obtaining a name resolution request for an enterprise service to be accessed by an endpoint device. A plurality of service instances are configured to provide the enterprise service.

The method 500 further involves at 504, determining, based on the name resolution request, a monitoring agent from a plurality of monitoring agents of a monitoring service that monitors performance of the enterprise service and at 506, selecting a service instance, from the plurality of service instances, that is associated with the monitoring agent in a name resolution record.

The method 500 further involves at 508, providing, to the endpoint device, location information for accessing the service instance and provisioning the monitoring agent to monitor the performance of the enterprise service executed by the service instance for the endpoint device. In one example, the monitoring agent may be provisioned by a controller.

In one instance, the operation 504 of determining the monitoring agent may include selecting the monitoring agent from the plurality of monitoring agents based on context awareness including a location of the endpoint device and a traffic profile associated with the endpoint device.

In one or more example embodiments, the operation 506 of selecting the service instance may include performing a lookup operation, in a domain name system having a plurality of name resolution records, for the location information of the service instance. The plurality of name resolution records may be augmented with monitoring information about one or more monitoring agents of the plurality of monitoring agents.

In one form, the method 500 may further include populating, the plurality of name resolution records in the domain name system, which map a name of the enterprise service with a plurality of addresses of the plurality of service instances, with the monitoring information including an identifier and a location for each of the plurality of monitoring agents and respective monitoring testcases indicating one or more types of telemetry data to collect by the monitoring service.

In another form, the method 500 may further include selecting one or more testcases to be executed by the monitoring agent based on at least one of the enterprise service, the endpoint device, or a user profile. The one or more testcases may indicate type of telemetry data to collect by the monitoring agent.

In one or more example embodiments, the operation 506 of selecting the service instance may include performing a lookup operation in an open domain name service. The open domain name service may store a domain name of the enterprise service, a first plurality of internet protocol (IP) addresses for the plurality of service instances of the enterprise service, and a second plurality of IP addresses for the plurality of monitoring agents of the monitoring service. Each of the second plurality of IP addresses may be stored in association with one or more of the first plurality of IP addresses.

In one form, the operation 504 of determining the monitoring agent may include determining the monitoring agent based on an indicator in the name resolution request. The indicator may be for enabling the monitoring service for the enterprise service.

In yet another form, the operation 504 of determining the monitoring agent may include determining whether a user of the endpoint device is entitled to access the monitoring service based on user information in the name resolution request. The operation 506 of selecting the service instance may include selecting the service instance from a set of service instances that are associated with respective monitoring agents, based on determining that the user is entitled to access the monitoring service.

In one or more example embodiments, determining whether the user of the endpoint device is entitled to access the monitoring service may include performing a lookup operation, in a user entitlement record, to determine whether the user is entitled to access the monitoring service and determining, from the user entitlement record, one or more testcases associated with an enabled monitoring service. The one or more testcases may indicate one or more types of telemetry data to be collected by the enabled monitoring service.

In one instance, the operation 508 of provisioning the monitoring agent to monitor the performance of the enterprise service executed by the service instance may include providing information about the monitoring agent and the one or more testcases to a controller of the monitoring service. The controller may provision the monitoring agent to execute the one or more testcases for monitoring the performance of the enterprise service for the endpoint device.

In one or more example embodiments, the method 500 may further involve determining that the name resolution request includes an internal name of the enterprise service and providing the name resolution request to a private name resolution service that is hosted in a private zone of an enterprise network. The private name resolution service may determine the monitoring agent based on information in the name resolution request and an internal name resolution storage that associates at least one of the plurality of service instances with one or more of the plurality of monitoring agents.

Figure 6:
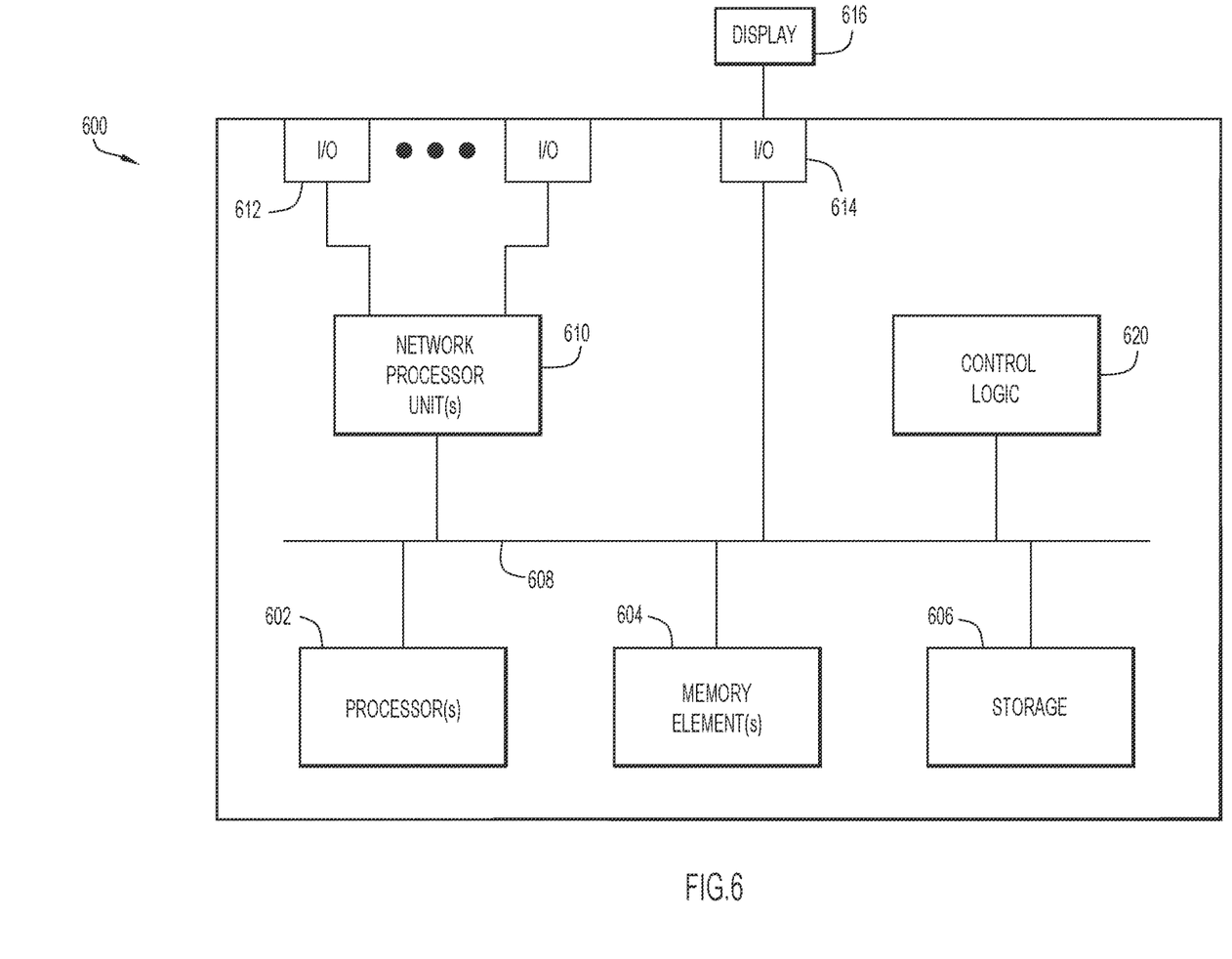
FIG. 6 is a hardware block diagram of a computing device that may perform functions associated with any combination of operations in connection with the techniques depicted and described in FIGS. 1-5, according to various example embodiments.

FIG. 6 is a hardware block diagram of a computing device 600 that may perform functions associated with any combination of operations in connection with the techniques depicted in FIGS. 1-5, according to various example embodiments, including, but not limited to, operations of the endpoint device 210 of FIG. 2 or the endpoint device 310 of FIG. 3, the name resolution service 110 of FIGS. 1-4, the private name resolution service 410 of FIG. 4, the enterprise service instances 122a-n of FIGS. 1-3, the VPCs 422a-m of FIG. 4, the monitoring agents 132a-k of FIGS. 1-3, the private monitoring agents 432a-j of FIG. 4, or the monitoring service controller 320. It should be appreciated that FIG. 6 provides only an illustration of one example embodiment and does not imply any limitations with regard to the environments in which different example embodiments may be implemented. Many modifications to the depicted environment may be made.

In at least one embodiment, computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with one or more memory elements 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 616, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, one or more non-transitory computer readable storage media encoded with software that includes computer executable instructions are provided. When the media is executed by a processor, the instructions cause the processor to perform operations that include obtaining a name resolution request for an enterprise service to be accessed by an endpoint device. A plurality of service instances are configured to provide the enterprise service. The operations further include determining, based on the name resolution request, a monitoring agent from a plurality of monitoring agents of a monitoring service that monitors performance of the enterprise service and selecting a service instance, from the plurality of service instances, that is associated with the monitoring agent in a name resolution record. The operations further include providing, to the endpoint device, location information for accessing the service instance and provisioning the monitoring agent to monitor the performance of the enterprise service executed by the service instance for the endpoint device.

In yet another example embodiment, a system is provided that includes the devices and operations explained above with reference to FIGS. 1-6.

The programs described herein (e.g., control logic 620) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 606 and/or memory elements(s) 604 can store data, software, code, instructions (e.g., processor instructions), logic, parameters, combinations thereof, and/or the like used for operations described herein. This includes the storage 606 and/or memory elements(s) 604 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining a name resolution request for an enterprise service to be accessed by an endpoint device, wherein a plurality of service instances are configured to provide the enterprise service;
    determining, based on the name resolution request, a monitoring agent from a plurality of monitoring agents of a monitoring service that monitors performance of the enterprise service;
    selecting a service instance, from the plurality of service instances, that is associated with the monitoring agent in a name resolution record, wherein the name resolution record is augmented with an identifier, a location of the monitoring agent associated with the service instance from the plurality of monitoring agents that provide the monitoring service, and monitoring information including one or more testcases to monitor the performance of the enterprise service for the endpoint device; and
    providing, to the endpoint device, location information for accessing the service instance and provisioning the monitoring agent to monitor the performance of the enterprise service executed by the service instance for the endpoint device.

2. The method of claim 1, wherein determining the monitoring agent includes:
    selecting the monitoring agent from the plurality of monitoring agents based on context awareness including a first location of the endpoint device and a traffic profile associated with the endpoint device.

3. The method of claim 1, wherein selecting the service instance includes:
    performing a lookup operation, in a domain name system having a plurality of name resolution records, for the location information of the service instance, wherein the plurality of name resolution records are augmented with monitoring information about one or more monitoring agents of the plurality of monitoring agents.

4. The method of claim 3, further comprising:
    populating, the plurality of name resolution records in the domain name system, which map a name of the enterprise service with a plurality of addresses of the plurality of service instances, with the monitoring information including the identifier and the location for each of the plurality of monitoring agents and respective monitoring testcases indicating one or more types of telemetry data to collect by the monitoring service.

5. The method of claim 1, further comprising:
    selecting the one or more testcases to be executed by the monitoring agent based on at least one of the enterprise service, the endpoint device, or a user profile, wherein the one or more testcases indicate type of telemetry data to collect by the monitoring agent.

6. The method of claim 1, wherein selecting the service instance includes:
    performing a lookup operation in an open domain name service that stores:
        a domain name of the enterprise service,
        a first plurality of Internet Protocol (IP) addresses for the plurality of service instances of the enterprise service, and
        a second plurality of IP addresses for the plurality of monitoring agents of the monitoring service, wherein each of the second plurality of IP addresses is stored in association with one or more of the first plurality of IP addresses.

7. The method of claim 1, wherein determining the monitoring agent includes:
    determining the monitoring agent based on an indicator in the name resolution request, wherein the indicator is for enabling the monitoring service for the enterprise service.

8. The method of claim 1, wherein determining the monitoring agent includes determining whether a user of the endpoint device is entitled to access the monitoring service based on user information in the name resolution request, and
    wherein selecting the service instance includes selecting the service instance from a set of service instances that are associated with respective monitoring agents, based on determining that the user is entitled to access the monitoring service.

9. The method of claim 8, wherein determining whether the user of the endpoint device is entitled to access the monitoring service includes:

performing a lookup operation, in a user entitlement record, to determine whether the user is entitled to access the monitoring service; and
determining, from the user entitlement record, the one or more testcases associated with an enabled monitoring service, wherein the one or more testcases indicate one or more types of telemetry data to be collected by the enabled monitoring service.

10. The method of claim 9, wherein provisioning the monitoring agent to monitor the performance of the enterprise service executed by the service instance includes:
providing the identifier and the location of the monitoring agent and the one or more testcases to a controller of the monitoring service, wherein the controller provisions the monitoring agent to execute the one or more testcases for monitoring the performance of the enterprise service for the endpoint device.

11. The method of claim 1, further comprising:
determining that the name resolution request includes an internal name of the enterprise service; and
providing the name resolution request to a private name resolution service that is hosted in a private zone of an enterprise network,
wherein the private name resolution service determines the monitoring agent based on data in the name resolution request and an internal name resolution storage that associates at least one of the plurality of service instances with one or more of the plurality of monitoring agents.

12. The method of claim 1, wherein the name resolution record includes a mapping of a name of the enterprise service to a first location of the service instance and the location of the monitoring agent and a second location of another service instance not associated with another monitoring agent of the plurality of monitoring agents.

13. The method of claim 1, wherein the name resolution request includes a first location of the endpoint device and determining the monitoring agent includes:
detecting presence of an indicator in the name resolution request, wherein the indicator is for enabling the monitoring service for the enterprise service; and
in response to detecting the presence of the indicator in the name resolution request, selecting the monitoring agent from the plurality of monitoring agents of the monitoring service based on the first location of the endpoint device.

14. An apparatus comprising:
a plurality of ports each configured to receive and send packets in a network; and
a processor, wherein the processor is configured to perform operations comprising:
obtaining a name resolution request for an enterprise service to be accessed by an endpoint device, wherein a plurality of service instances are configured to provide the enterprise service;
determining, based on the name resolution request, a monitoring agent from a plurality of monitoring agents of a monitoring service that monitors performance of the enterprise service;
selecting a service instance, from the plurality of service instances, that is associated with the monitoring agent in a name resolution record, wherein the name resolution record is augmented with an identifier and a location of the monitoring agent associated with the service instance from the plurality of monitoring agents that provide the monitoring service, and monitoring information including one or more testcases to monitor the performance of the enterprise service for the endpoint device; and
providing, to the endpoint device, location information for accessing the service instance and provisioning the monitoring agent to monitor the performance of the enterprise service executed by the service instance for the endpoint device.

15. The apparatus of claim 14, wherein the processor is configured to determine the monitoring agent by:
selecting the monitoring agent from the plurality of monitoring agents based on context awareness including a first location of the endpoint device and a traffic profile associated with the endpoint device.

16. The apparatus of claim 14, wherein the processor is configured to select the service instance by:
performing a lookup operation, in a domain name system having a plurality of name resolution records, for the location information of the service instance, wherein the plurality of name resolution records are augmented with the monitoring information about one or more monitoring agents of the plurality of monitoring agents.

17. The apparatus of claim 16, wherein the processor is further configured to perform:
populating, the plurality of name resolution records in the domain name system, which map a name of the enterprise service with a plurality of addresses of the plurality of service instances, with the monitoring information including the identifier and the location for each of the plurality of monitoring agents and respective monitoring testcases indicating one or more types of telemetry data to collect by the monitoring service.

18. The apparatus of claim 14, wherein the processor is further configured to perform:
selecting the one or more testcases to be executed by the monitoring agent based on at least one of the enterprise service, the endpoint device, or a user profile, wherein the one or more testcases indicate type of telemetry data to collect by the monitoring agent.

19. One or more non-transitory computer readable storage media encoded with software comprising computer executable instructions that, when executed by a processor, cause the processor to perform operations including:
obtaining a name resolution request for an enterprise service to be accessed by an endpoint device, wherein a plurality of service instances are configured to provide the enterprise service;
determining, based on the name resolution request, a monitoring agent from a plurality of monitoring agents of a monitoring service that monitors performance of the enterprise service;
selecting a service instance, from the plurality of service instances, that is associated with the monitoring agent in a name resolution record, wherein the name resolution record is augmented with an identifier, a location of the monitoring agent associated with the service instance from the plurality of monitoring agents that provide the monitoring service, and monitoring information including one or more testcases to monitor the performance of the enterprise service for the endpoint device; and
providing, to the endpoint device, location information for accessing the service instance and provisioning the monitoring agent to monitor the performance of the enterprise service executed by the service instance for the endpoint device.

20. The one or more non-transitory computer readable storage media according to claim 19, wherein the computer executable instructions cause the processor to determine the monitoring agent by:
    selecting the monitoring agent from the plurality of monitoring agents based on context awareness including a first location of the endpoint device and a traffic profile associated with the endpoint device.

\* \* \* \* \*